United States Patent
Prince et al.

(10) Patent No.: US 9,249,891 B2
(45) Date of Patent: Feb. 2, 2016

(54) PRESSURE RELIEF VALVE AND SECONDARY SPRING FORCE CONTAINMENT ASSEMBLY

(71) Applicant: McKenzie Valve & Machine LLC, McKenzie, TN (US)

(72) Inventors: Donald Prince, McKenzie, TN (US); Thomas Summers, McKenzie, TN (US)

(73) Assignee: McKenzie Valve and Machine LLC, McKenzie, TN (US)

( * ) Notice: Subject to any disclaimer, the term of this patent is extended or adjusted under 35 U.S.C. 154(b) by 485 days.

(21) Appl. No.: 13/675,721

(22) Filed: Nov. 13, 2012

(65) Prior Publication Data

US 2014/0130908 A1    May 15, 2014

(51) Int. Cl.
*F16K 17/08*    (2006.01)
*F16K 17/04*    (2006.01)

(52) U.S. Cl.
CPC ....... *F16K 17/0413* (2013.01); *Y10T 137/7924* (2015.04); *Y10T 137/7932* (2015.04)

(58) Field of Classification Search
CPC ... F16K 15/00; F16K 17/06; Y10T 137/7932; Y10T 137/7924
USPC .......................................... 137/536, 541, 542
See application file for complete search history.

(56) References Cited

U.S. PATENT DOCUMENTS

| | | | |
|---|---|---|---|
| 2,888,037 A * | 5/1959 | Jones et al. | ................... 137/528 |
| 3,068,894 A | 12/1962 | Bunting et al. | |
| 3,131,718 A | 5/1964 | Mingrone | |
| 3,455,316 A | 7/1969 | Rogers | |
| 3,974,850 A | 8/1976 | Pierson | |
| 4,156,435 A | 5/1979 | Norton et al. | |
| 5,078,177 A | 1/1992 | Tartaglia et al. | |
| 5,323,142 A | 6/1994 | Fain | |
| 5,855,225 A | 1/1999 | Williams, III | |
| 5,960,823 A | 10/1999 | Wilkins | |
| 7,677,266 B2 | 3/2010 | Patterson | |
| 8,136,546 B2 | 3/2012 | Griffiths et al. | |
| 2003/0217770 A1 | 11/2003 | Schultz et al. | |

* cited by examiner

*Primary Examiner* — Kevin Lee
*Assistant Examiner* — P. Macade Nichols
(74) *Attorney, Agent, or Firm* — Banner & Witcoff, Ltd.

(57) ABSTRACT

A valve having secondary spring force containment includes a valve body featuring an opening with a valve closure member sized to close the opening. A stem has a first end connected to the valve closure member. A proximal spring seat is positioned adjacent to the valve body, A distal spring seat is mounted on the second end of the stem. A spring is positioned between the proximal and distal spring seats so that the valve closure member is urged into a position where the valve body opening is closed. A hollow rod is attached between the proximal and distal spring seats to provide secondary spring force containment with the stem passing through the hollow rod.

20 Claims, 12 Drawing Sheets

PRESSURE RELIEF VALVE AND SECONDARY SPRING FORCE CONTAINMENT ASSEMBLY

FIELD OF THE INVENTION

The present invention relates generally to pressure relief valves and, more particularly, to a pressure relief valve and a secondary spring three containment assembly.

BACKGROUND

As is known in the art, tanks containing fluids under pressure are often provided with pressure relief valves. Such tanks may exist, for example, on railroad tank cars. Pressure relief valves typically use a compression spring to maintain the valve in a closed condition. When the pressure in the tank exceeds a pre-determined level, the spring force holding the valve in the closed condition is overcome and the valve opens so that fluid from the tank is vented to ambient so as to lower the pressure within the tank. An example of such a pressure relief valve is presented in U.S. Pat. No. 3,131,718 to Mingrone.

Pressure relief valves that are spring powered typically have a stem axially aligned with the motion of the valve closure member. This stem typically passes through the center of a coil spring and is typically used to set the compression spring at a correct height (or extension if a tension spring is used to achieve the force for the desired pre-determined venting pressure. In the event that the spring is not compressed before removing the component used to set the spring, such as during disassembly of the valve for service, repair or replacement, the spring can release stored energy in unpredictable directions. In the theoretical scenario of stein breakage or other component failure, the spring force can also be released in the unpredictable directions.

A need therefore exists for a device that reduces or eliminates the risk of accidental release of spring forces in a pressure relief valve assembly.

DETAILED DESCRIPTION OF EMBODIMENTS

Figure 1:
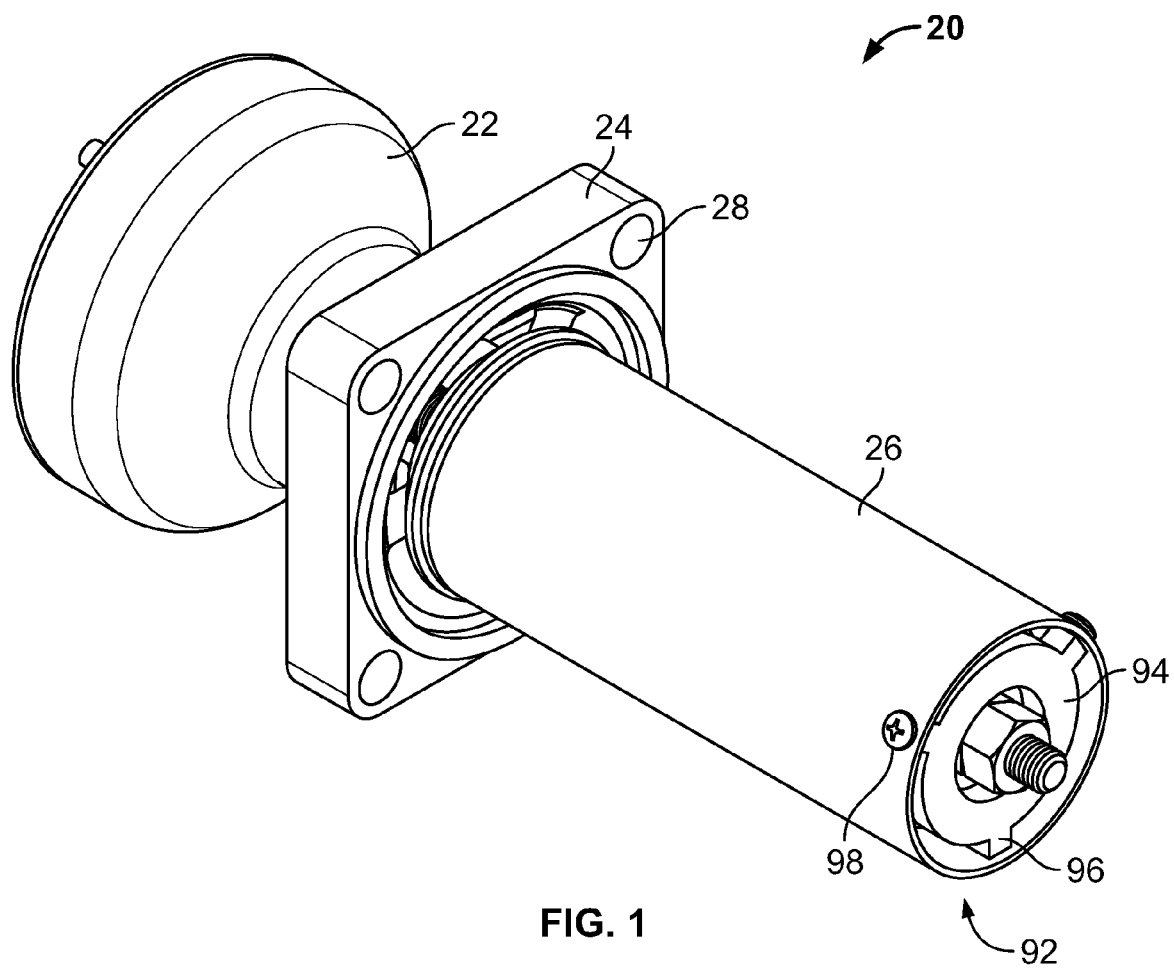
FIG. 1 is a bottom perspective view of a pressure relief valve constructed in accordance with a first embodiment of the present invention.
Figure 2:
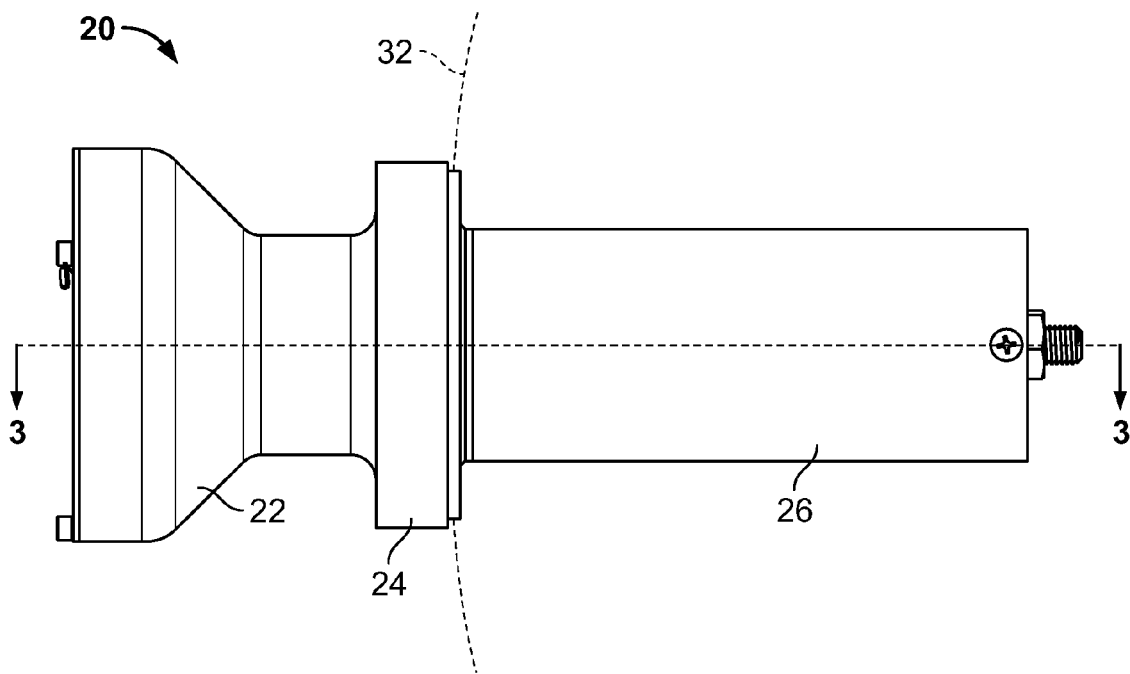
FIG. 2 is a side elevational view of the valve of FIG. 1 in a closed condition.

A pressure relief valve constructed in accordance with a first embodiment of the invention is indicated in general at 20 in FIGS. 1 and 2. As illustrated in FIG. 1, the valve includes a valve body 22, a base 24 and a canister 26. The base features a number of fastener openings 28 by which the valve may be secured within the wall of a tank (indicated in phantom at 32 in FIG. 2) with the canister portion 2.6 positioned within the interior of the tank and the valve body 22 positioned external to the tank.

Figure 3:
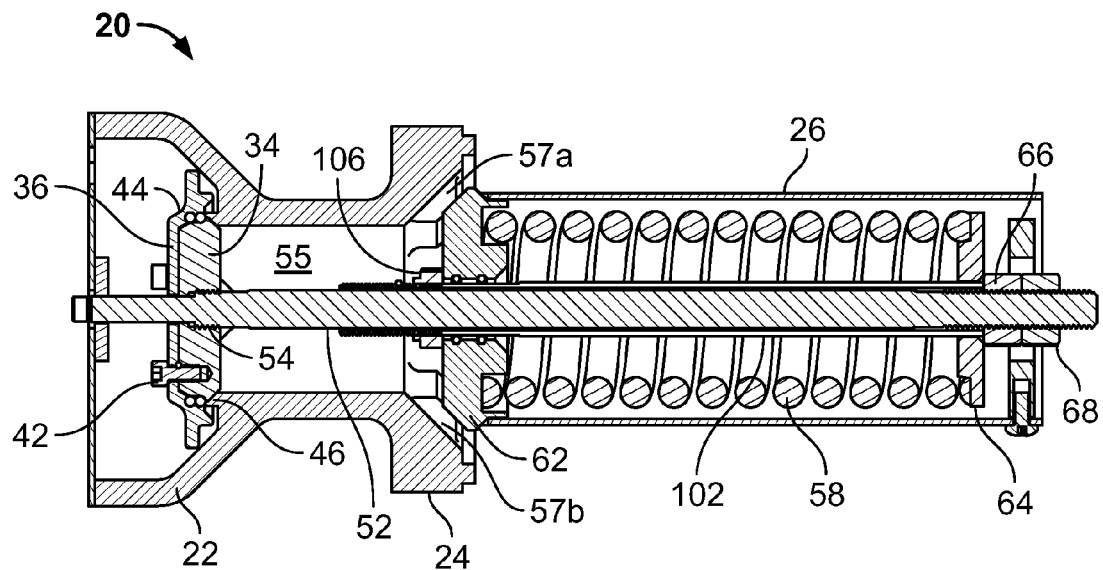
FIG. 3 is a cross sectional view of the valve of FIG. 2 taken along line 3-3 of FIG. 2.

As illustrated in FIG. 3, the valve body houses a valve closure member 34 featuring a cap 36 secured to the member 34 by fasteners 42. An annular groove is formed between the member 34 and the cap 36 within which an O-ring 44 is positioned. The O-ring 44 circumferentially engages an annular edge 46 formed around the valve opening in the valve body when the valve is in the closed condition (illustrated in FIGS. 1-3). The closure member 34 and the interior walls of the valve body 22 define a chamber 55 that communicates with the interior of the tank via passages 57a and 57b.

A valve stem 52 is secured to the valve closure member 34 by threads 54 and passes through an opening formed in the base 24 and through the center of valve compression coil spring 58. The spring is trapped between a proximal spring seat 62 and a distal spring scat 64, through which the stem 52 also passes. The spring is secured in a compressed state between the proximal and distal seats by nuts 66 and 68 which engage a threaded distal end portion of the stem 52. The amount by which spring 58 is compressed, as determined by the position of nuts 66 and 58 on the valve stem 52, determines the spring force that keeps the valve closure member closed (i.e. in the condition illustrated in FIGS. 1-3).

Figure 5:
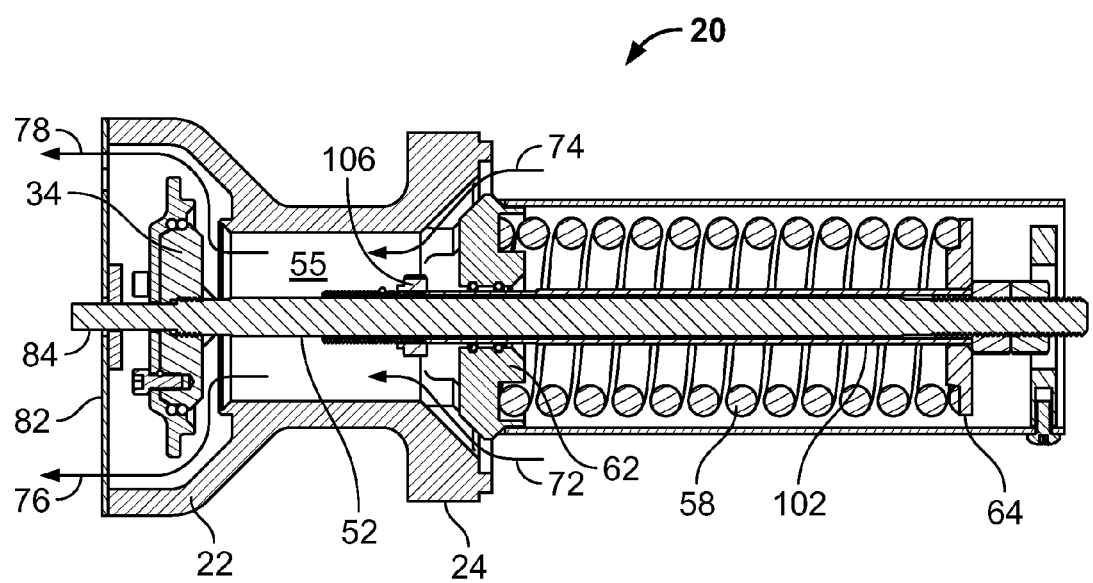
FIG. 5 is a cross sectional view of the valve of FIG. 4 taken along line 5-5 of FIG. 4.

As illustrated in FIG. 5, when the pressure within the tank within which the valve is mounted exceeds the pressure setting of the valve, the valve spring 58 is further compressed between the proximal and distal seats 62 and 64 as the valve closure member 34 is moved (by pressure M chamber 55) to a position where the O-ring 44 is lifted off of the annular edge 46. As a result, pressurized fluid travels out of the tank, as indicated by arrows 72 and 74, through valve body clamber 53 and out of the valve opening past the closure member 34, as indicated by arrows 76 and 78.

Figure 4:
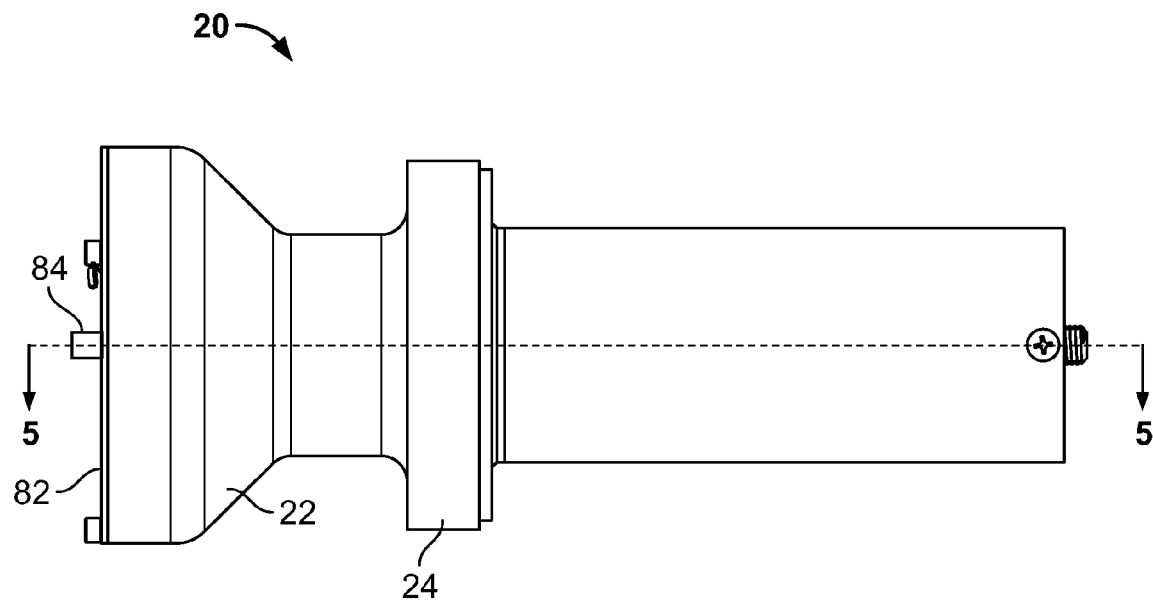
FIG. 4 is a side elevational view of the valve of FIG. 1 in an open condition.
Figure 8:
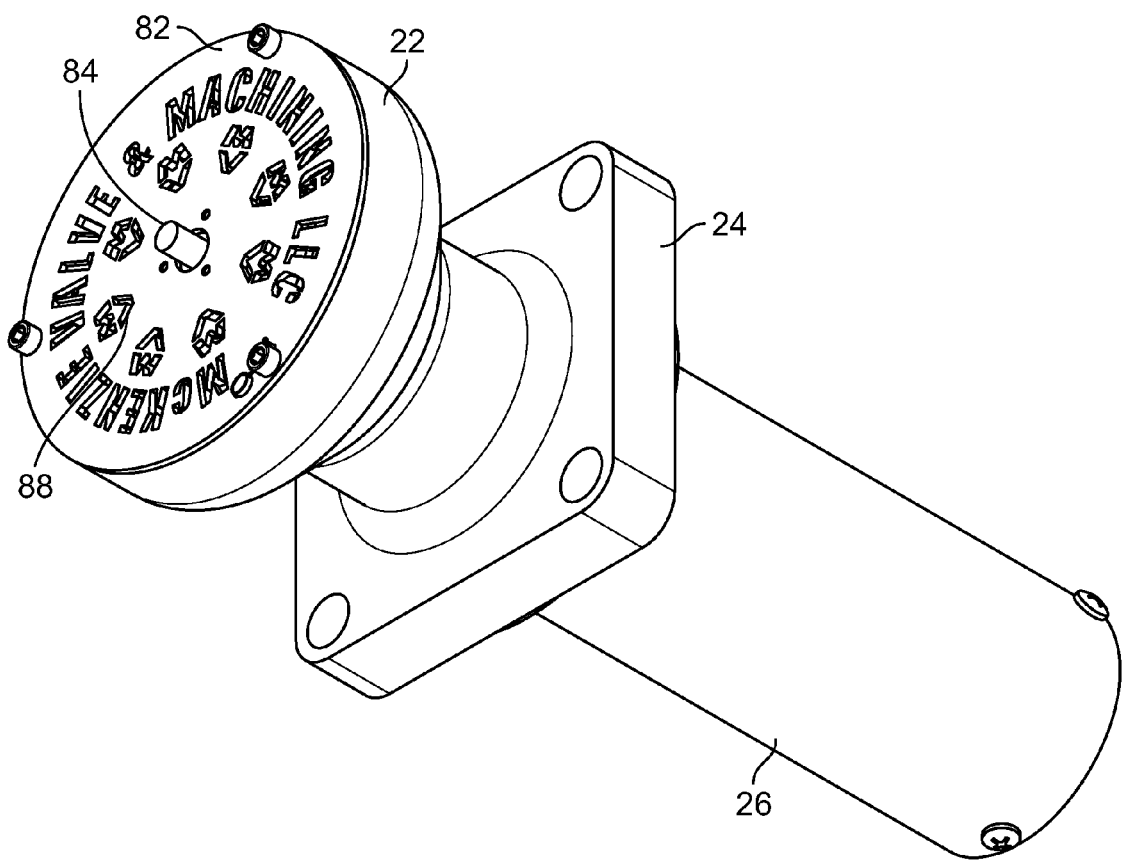
FIG. 8 is a top perspective view of the valve of FIGS. 4 and 5.

As illustrated in FIGS. 4 and 5, the end of the valve body 22 opposite base 24 is provided with a cover 82 to protect the valve closure member. The top end 84 of the stem 52 passes through an opening in the cover 82 when the valve is in the open condition to provide a visual indication of the valve condition to an observer. Furthermore, as illustrated in FIG. 8, the cover 82 is provided with vent openings 88 to permit pressurized fluid to pass through when the valve is in the open condition.

Figure 6:
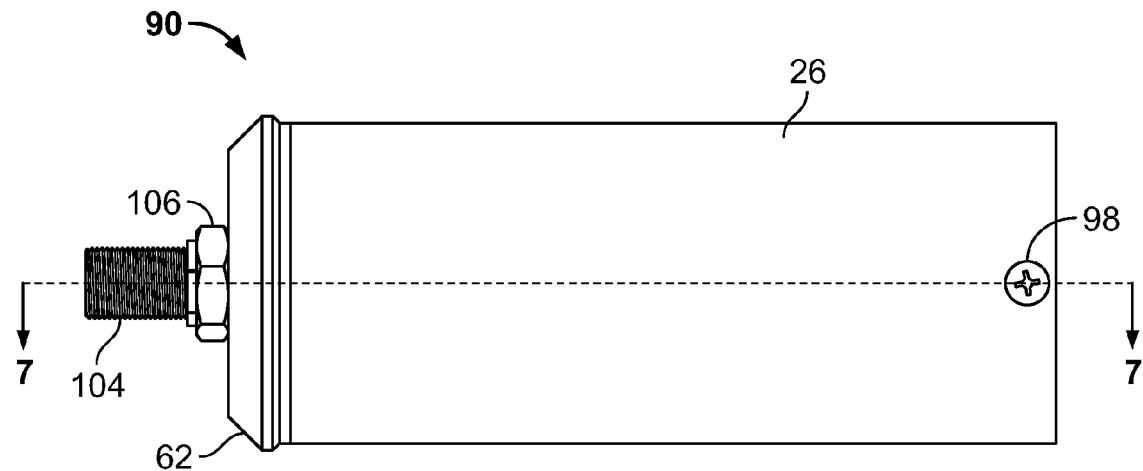
FIG. 6 is a side elevational view of the secondary spring force containment assembly of the valve of FIGS. 1-5.
Figure 7:
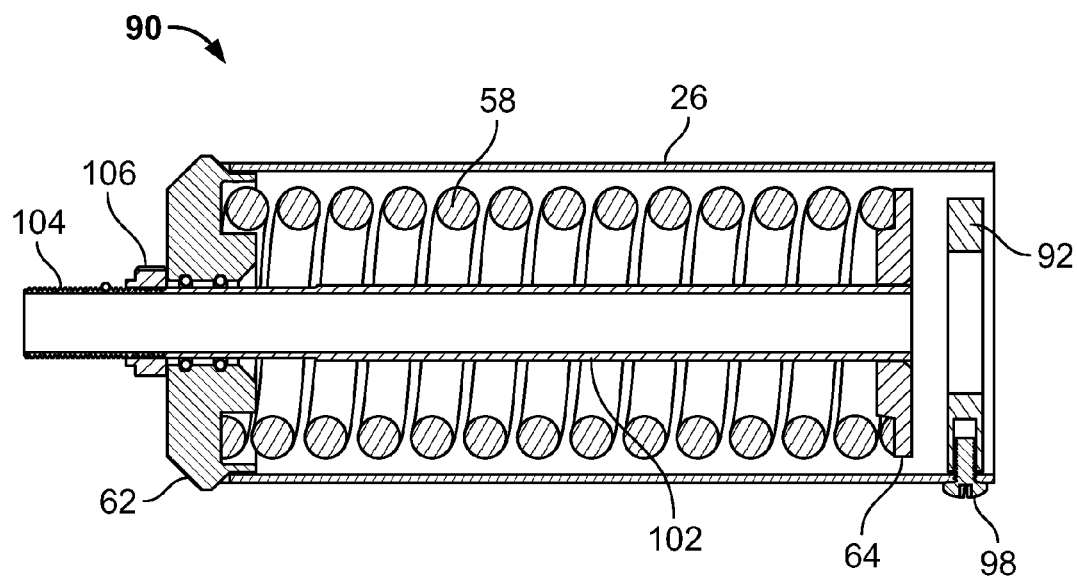
FIG. 7 is a cross sectional view of the secondary spring force containment assembly of FIG. 6 taken along line 7-7 of FIG. 6.

In accordance with the present invention, the valve 20 of FIGS. 1-5 is provided with a secondary spring force containment assembly. which will now be described with respect to FIGS. 6 and 7. As illustrated in FIGS. 6 and 7, the secondary spring force containment assembly, indicated in general at 90, includes a canister 26 that is circumferentially attached at one end to proximal spring seat 62. This attachment is made via welding, but alternatively may be made by fasteners. As yet another alternative, the proximal spring seat 62 and the cylinder 26 may be constructed as a single unit.

As illustrated in FIGS. 3 and 5, the proximal spring seat 62 is shaped to engage the base 24 when the valve is assembled.

The bottom of the canister 26 features an open end within which an insert 92 is positioned. More specifically, with reference to FIG. 1, the insert 92 features an annular portion 94 from which radial arms 96 extend. The end of each radial arm features a bore that receives a fastener 98 after it passes through a corresponding opening in cylinder 24.

As illustrated in FIGS. 6 and 7, the secondary spring force assembly 90 also features a hollow rod 102 that passes through the proximal spring seat 62 and features a distal end secured to distal spring seat 64, such as by welding or fastening. Alternatively, the hollow rod 102 and distal spring seat 64 could be constructed as a single unit.

The proximal end of rod 102 is provided with threads 104 which are engaged by nut 106. The position of nut 106 on the threaded proximal end of rod 102 compresses spring 58 equal to a force that is less than the force corresponding to the pressure relief setting of the valve 20.

As illustrated in FIGS. 3 and 5, valve stem 52 passes through hollow rod 102, As explained previously, nuts 66 and 68 are tightened to further compress spring 58 so that it provides a closing force for closure member 34 (against annular edge 46) that corresponds to the pressure setting of the valve.

During disassembly of the valve for service, repair or replacement, when runs 66 and 68 (FIG. 3) are removed, the spring 58 expands to the limit permitted by rod 102 and distal spring seat 64 (as illustrated in FIG. 7). In addition, spring 58 is captured in the manner illustrated in FIG. 7 should the stem 52 break or otherwise become disengaged from the valve closure member 34.

Figure 9:
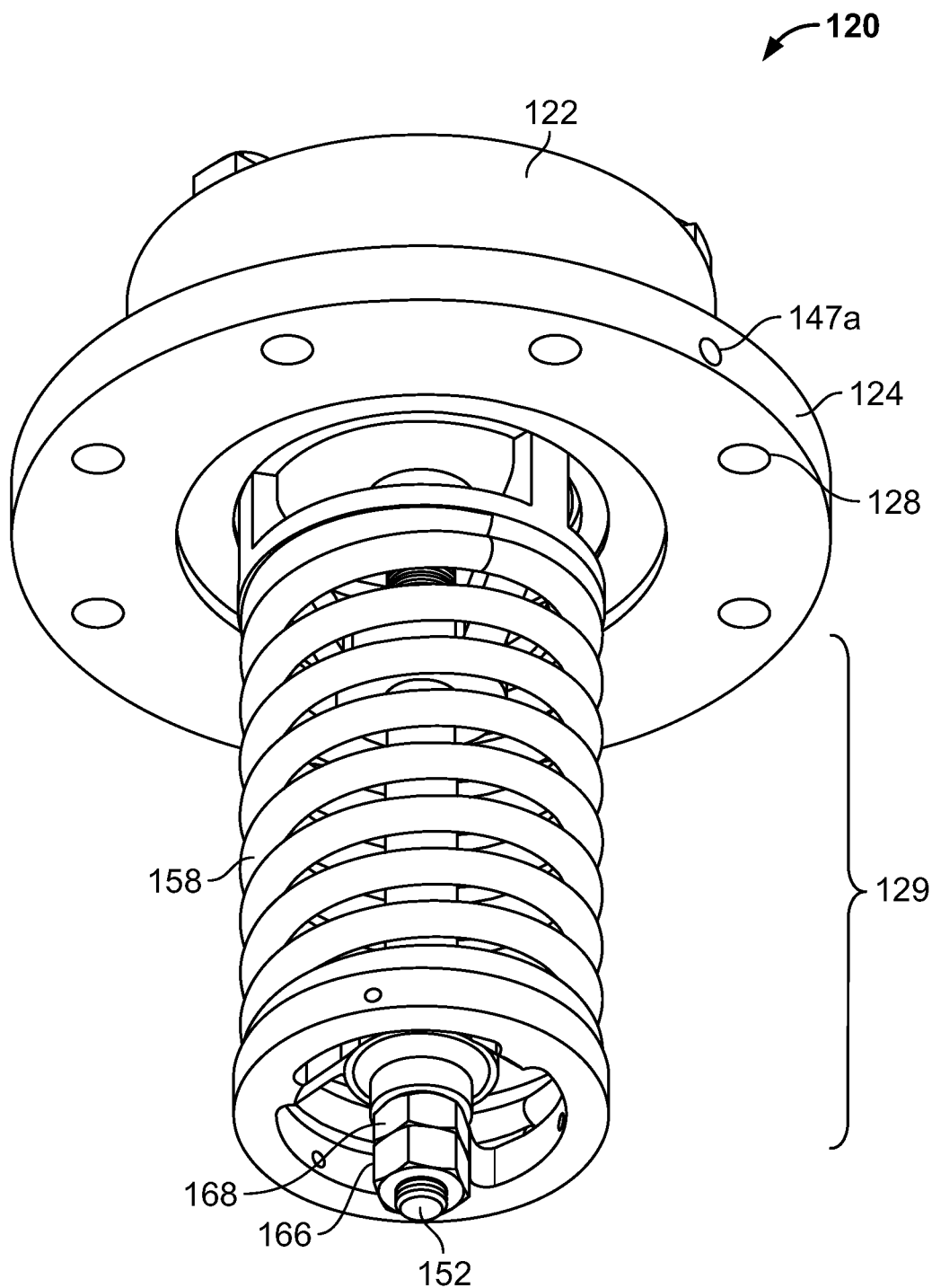
FIG. 9 is a bottom perspective view of a pressure relief valve constructed in accordance with a second embodiment of the present invention.
Figure 10:
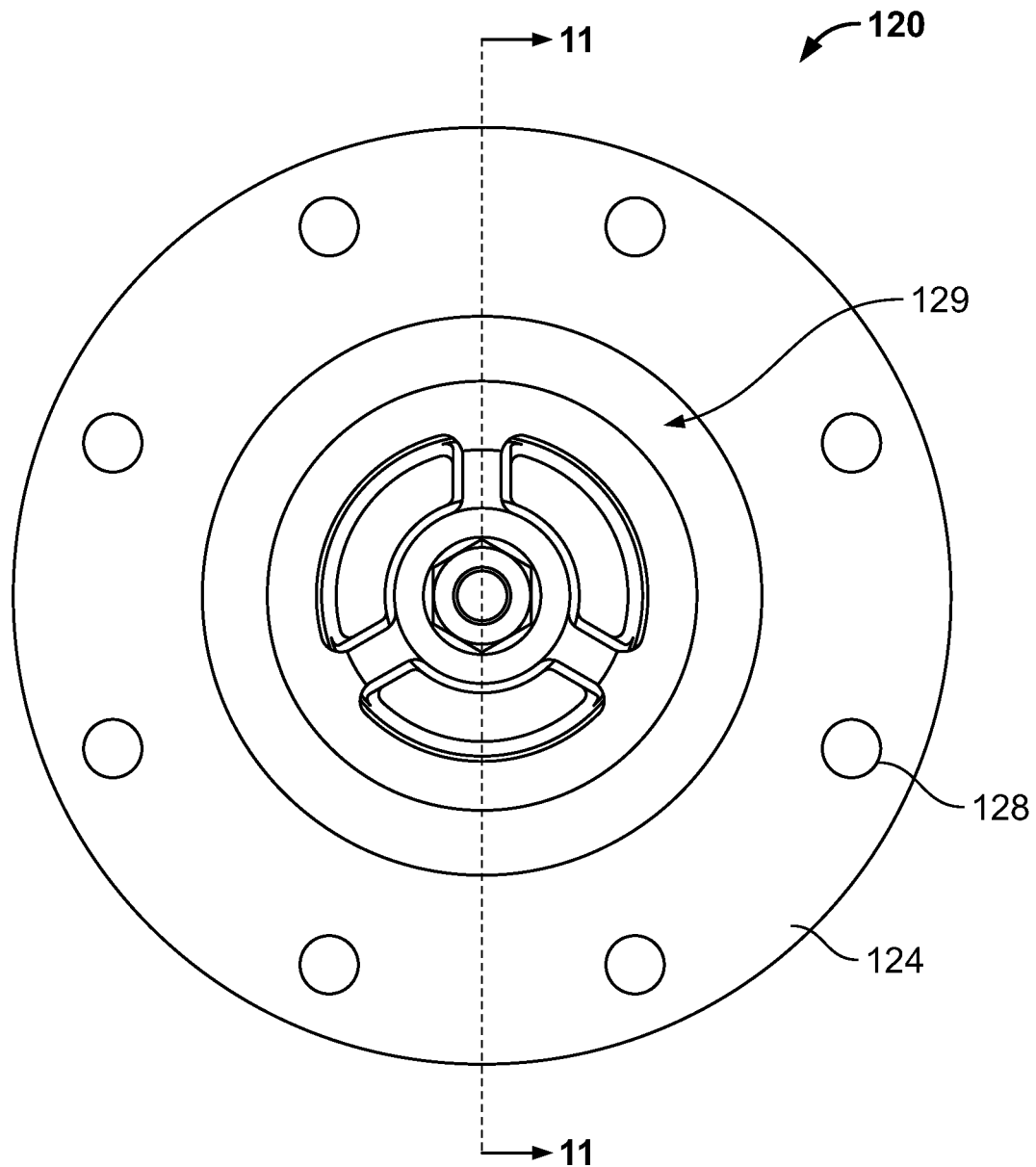
FIG. 10 is a bottom plan view of the valve of FIG. 9.

A pressure relief valve constructed in accordance with a second embodiment of the invention is indicated in general at 120 in FIGS. 9-13. As illustrated in FIGS. 9 and 10, the valve includes a valve body 122, a base 124 and a secondary spring force containment assembly 129. The base features a number of fastener openings 128 by which the valve may be secured within the wall of a. tank with the secondary spring three containment assembly 129 positioned within the interior of the tank and the valve body 122 positioned external to the tank.

Figure 11:
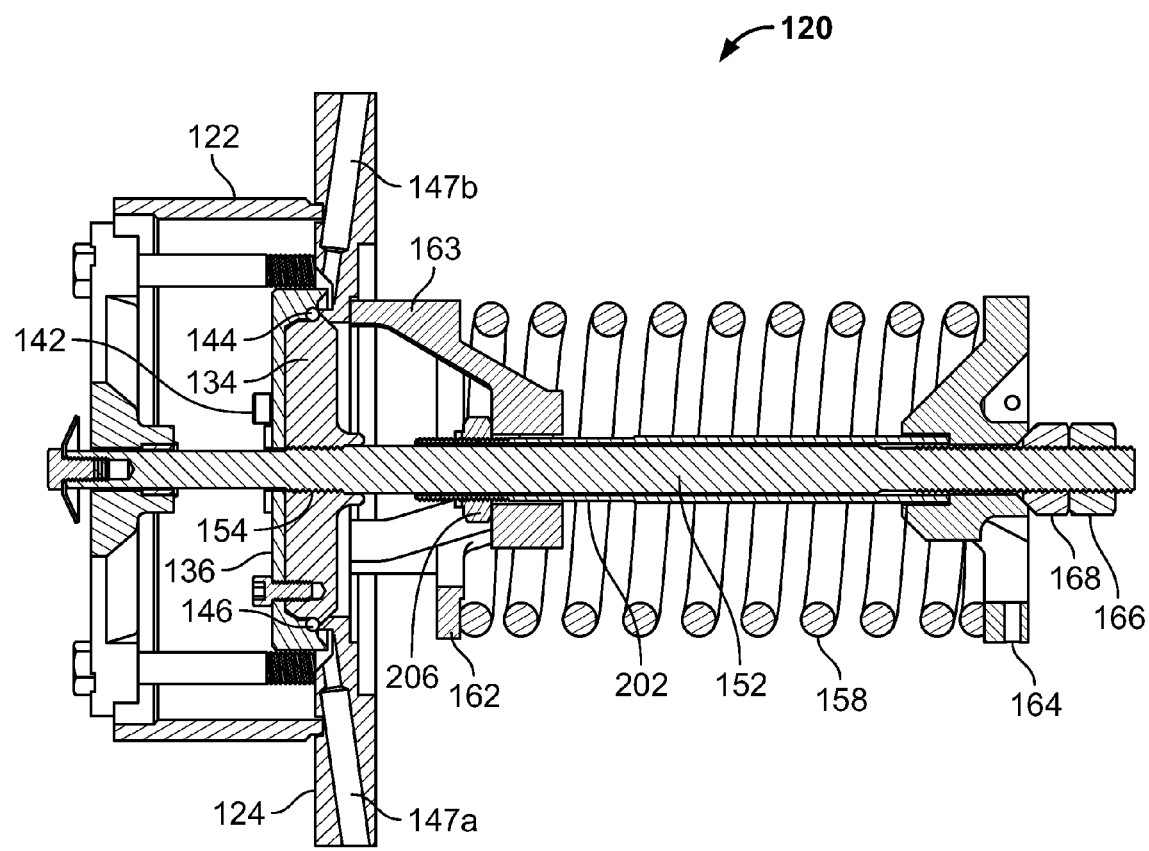
FIG. 11 is a cross sectional view of the valve of FIG. 10 taken along line 11-11 of FIG. 10 with the valve in a closed condition.

As illustrated in FIG. 11, the valve body houses a valve closure member 134 featuring a cap 136 secured to the member 134 by fasteners 142. An annular groove is formed between the member 134 and the cap 136 within which an O-ring 144 is positioned. The O-ring 144 circumferentially engages an annular edge 146 formed around the valve opening in the valve body when the valve is in the closed condition (illustrated in FIG. 11). The base 124 of the valve is provided with passages 147a and 147b to permit drainage of rain water and the like from inside valve body 122.

A valve stem 152 is secured to the valve closure member 134 by threads 154 and passes through the center of valve compression coil spring 158. The spring is trapped between a proximal spring seat 162 and a distal spring scat 164, through which the stem 152 also passes. The spring is secured in a compressed state between the proximal and distal seats by nuts 166 and 163 which engage a threaded distal end portion of the stem 152. The amount by which spring 158 is compressed, as determined by the position of nuts 166 and 168 on the valve stem 152 determines the spring force that keeps the valve closure member closed (i.e. in the condition illustrated in FIG. 11).

Figure 12:
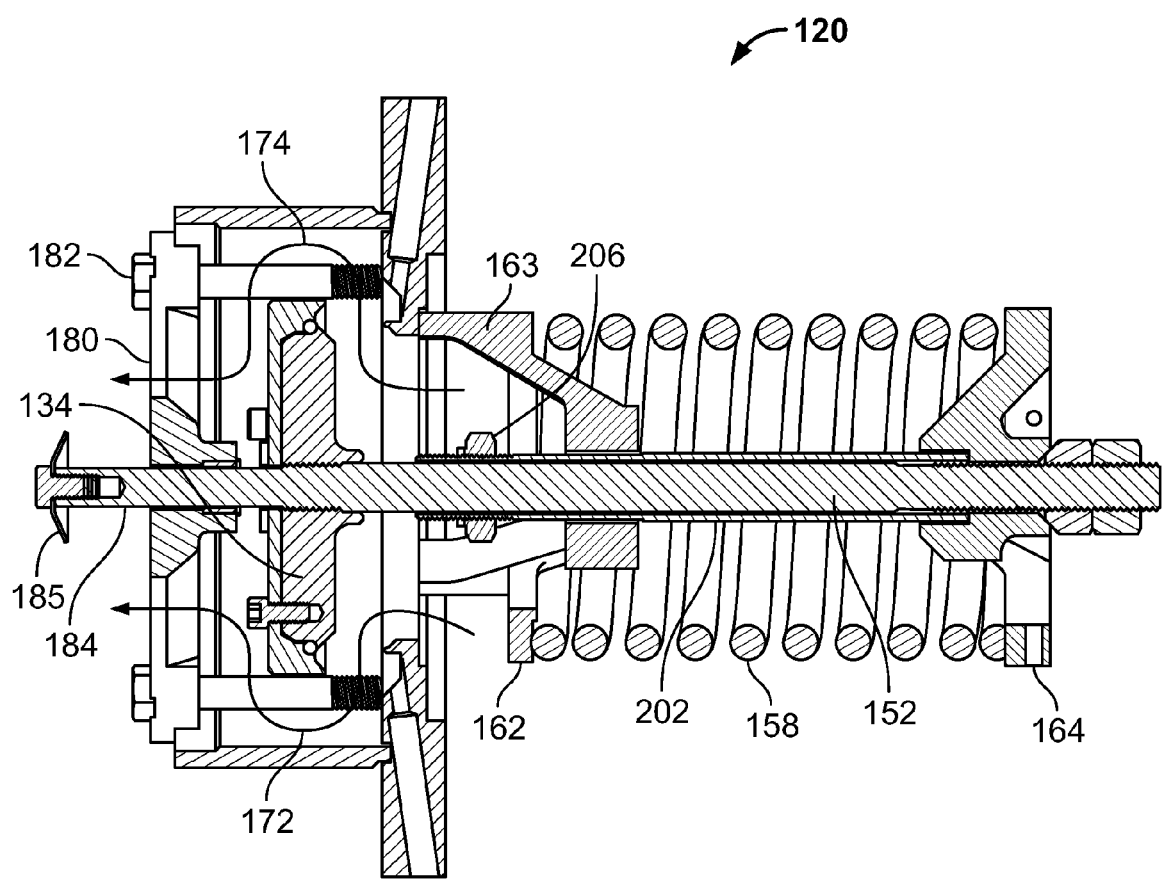
FIG. 12 is a cross sectional view of the valve of FIG. 11 in an open condition.

As illustrated in FIG. 12, when the pressure within the tank within which the valve is mounted exceeds the pressure setting of the valve, the valve spring 158 is further compressed between the proximal and distal seats 162 and 164 as the valve closure member 134 is moved (by pressure in the tank) to a position where the O-ring 144 is lifted off of the annular edge 146. As a result, pressurized fluid travels out of the tank and through the valve opening, as indicated by arrows 172 and 174.

Figure 13:
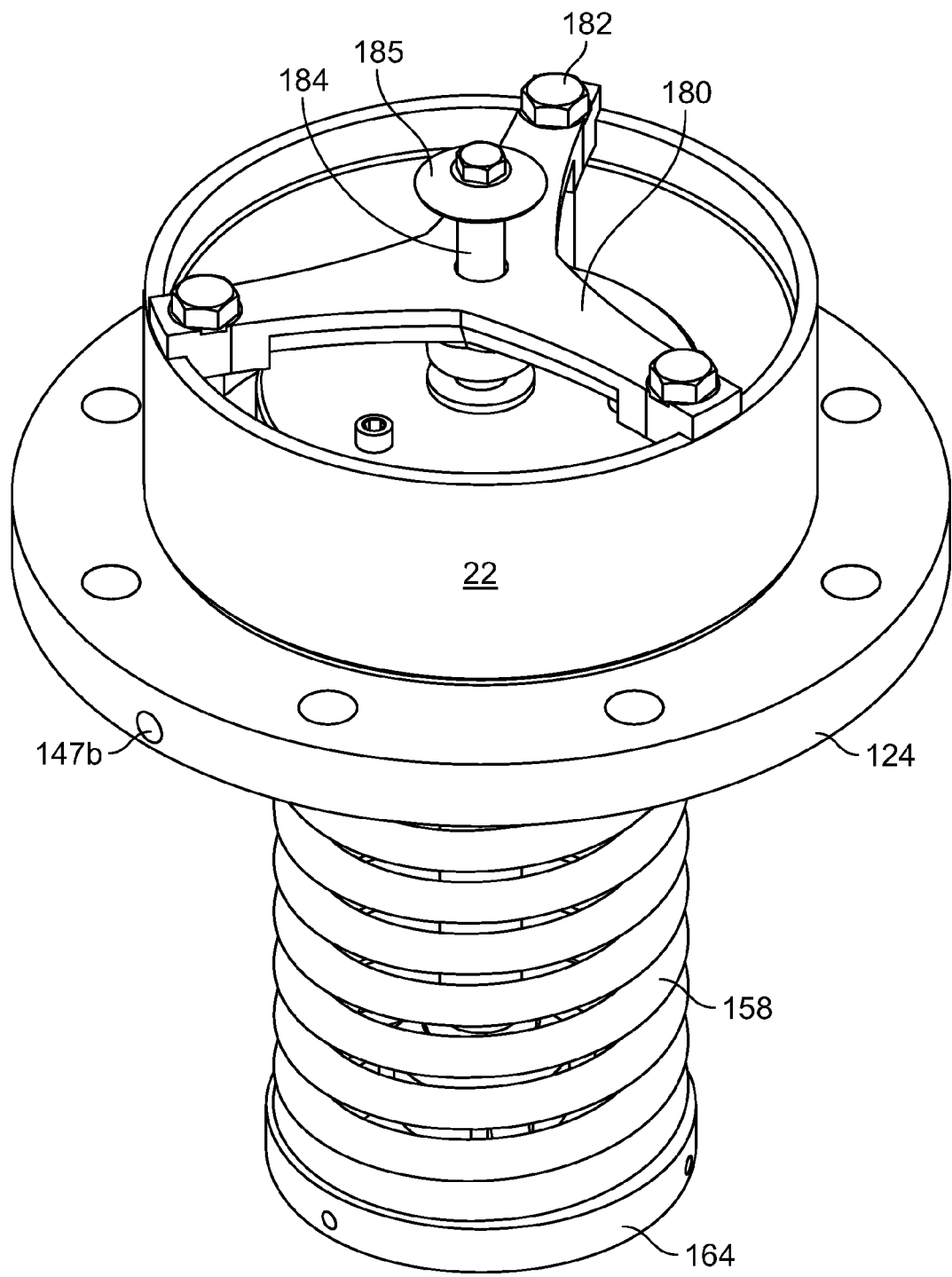
FIG. 13 is a top perspective view of the valve of FIG. 1

As illustrated in FIGS. 11-13, the top of valve body 122 is provided with a brace 180 which is secured in place by fasteners 182. The top end 184 of the stem 152 passes through an opening in the brace 180 and is provided with a flange 185. When the valve is in the open condition, the flange 185 is raised from the brace 180 and provides a visual indication of the valve condition to an observer.

Figure 14:
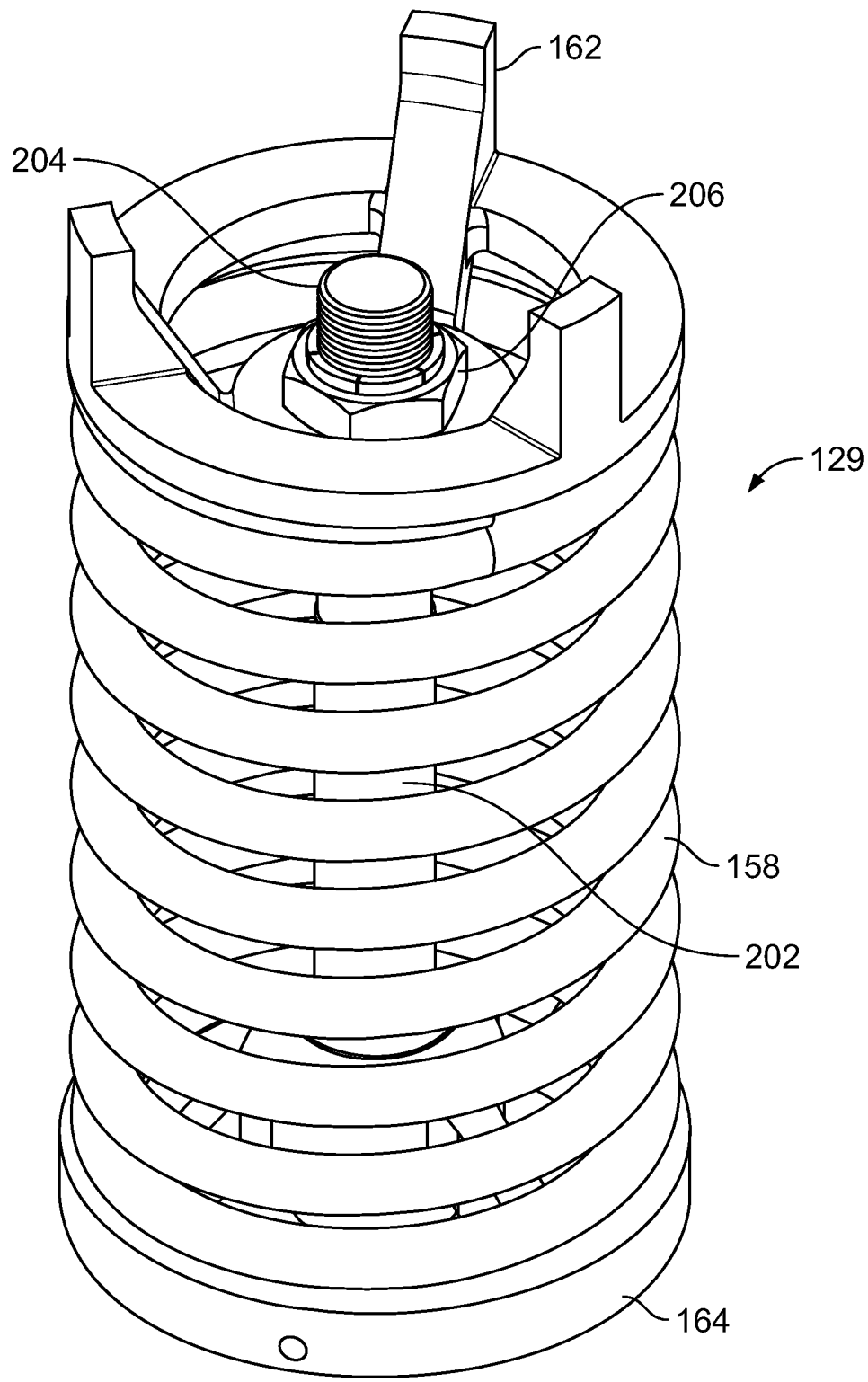
FIG. 14 is a top perspective view of the secondary spring force containment assembly of the yak e of FIGS. 9-13.
Figure 15:
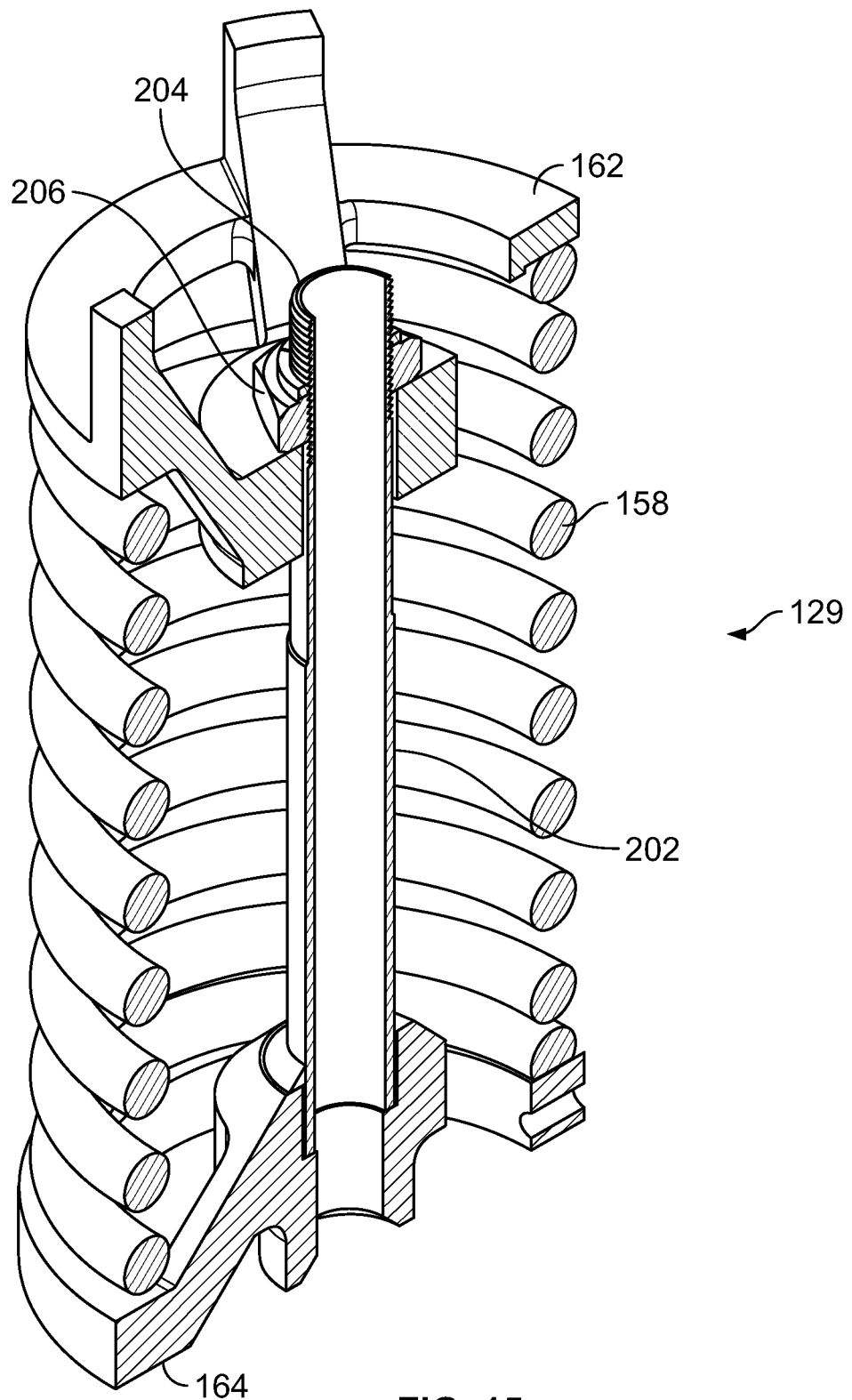
FIG. 15 is a cross sectional view of the secondary spring force containment assembly of FIG. 14.

In accordance with the present invention, the valve 120 of FIGS. 9-13 is provided with a secondary spring force containment assembly, which will now be described with respect to FIGS. 14 and 15. As illustrated in FIGS. 14 and 15, the secondary spring force containment assembly, indicated in general at 129, includes a hollow rod 202 that passes through the proximal spring seat 162 and features a distal end secured to distal spring seat 164, such as by welding or fastening. Alternatively, the hollow rod 202 and distal spring seat 164 could be constructed as a single unit.

As illustrated in FIGS. 11 and 12, the proximal spring seat 162 features tabs 163 that engage the base 124 when the valve is assembled.

The proximal end of rod 202 is provided with threads 204 which are engaged by nut 206. The position of nut 206 on the threaded proximal end of rod 202 compresses spring 158 equal to a force that is less than the force corresponding to the pressure relief setting of the valve 120.

As illustrated in FIGS. 11 and 12, valve stem 152 passes through hollow rod 202. As explained previously, nuts 166 and 168 are tightened to further compress spring 158 so that it provides a closing force for closure member 134 (against annular edge 146) that corresponds to the pressure setting of the valve.

During disassembly of the valve for service, repair or replacement, when nuts 166 and 168 are removed, the spring 158 expands to the limit permitted by rod 202 and distal spring seat 164 (as illustrated in FIGS. 14 and 15). In addition, spring 158 is captured in the manner illustrated in FIGS. 14 and 15 should the stem 152 break or otherwise become disengaged from the valve closure member 134.

As is clear from the above, the secondary spring containment assemblies described above with respect to FIGS. 6 and 7 and 14 and 15, and other embodiments of the present invention, could be used to retrofit previously produced pressure relief valves.

While the preferred embodiments of the invention have been shown and described, it will be apparent to those skilled in the art that changes and modifications may be made therein without departing from the spirit of the invention, the scope of which is defined by the appended claims.

What is claimed is:

1. A valve having secondary spring force containment comprising:
    a) a valve body featuring an opening;
    b) a valve closure member sized to close the opening of the valve body;
    c) a stem having a first end and a second end, the first end of the stem connected to the valve closure member;
    d) a proximal spring seat positioned adjacent to the valve body;

e) a distal spring seat mounted on the second end of the stem;

f) a compression coil spring positioned between the proximal and distal spring seats so that said valve closure member is urged into a position where the valve body opening is closed;

g) a hollow rod attached between the proximal and distal spring seats with said stem passing through the hollow rod; and h) said stem causing the spring to be compressed to a greater extent than the hollow rod so that the hollow rod retains the spring in a partially compressed state if the stem is released from the proximal or distal spring seat.

2. The valve of claim 1 wherein the distal spring seat is adjustably mounted on the stem.

3. The valve of claim 2 wherein the stem includes a threaded portion and the distal spring seat is adjustably mounted on the stem by a nut that engages the threaded portion of the stem.

4. The valve of claim 1 wherein a position of the proximal spring seat or a position of the distal spring seat is adjustable with respect to the hollow rod.

5. The valve of claim 1 further comprising a canister having a first end attached to the proximal spring seat, with said canister generally surrounding the spring.

6. The valve of claim 1 wherein the valve body includes a chamber in communication with the opening when the valve closure member is in an open condition where the valve closure member is not closing the valve body opening.

7. The valve of claim 1 wherein a position of the proximal or distal seat may be adjusted with respect to the stem and a position of the proximal or distal seat may be adjusted with respect to the hollow rod.

8. A valve having secondary spring force containment comprising:

a) a valve body featuring an opening;

b) a valve closure member sized to close the opening of the valve body;

c) a stem having a first end and a second end, the first end of the stem connected to the valve closure member;

d) a proximal spring seat positioned adjacent to the valve body;

e) a distal spring seat mounted on the second end of the stem;

f) a spring positioned between the proximal and distal spring seats so that said valve closure member is urged into a position where the valve body opening is closed;

g) a hollow rod attached between the proximal and distal spring seats with said stem passing through the hollow rod with a position of the proximal spring seat or a position of the distal spring seat being adjustable with respect to the hollow rod;

h) the hollow rod passing through the proximal spring seat and including a threaded portion; and i) the proximal spring seat secured to the hollow rod at least in part by a nut that engages the threaded portion of the hollow rod.

9. The valve of claim 8 wherein the spring is a coil spring.

10. The valve of claim 8 wherein the spring is a compression coil spring.

11. The valve of claim 8 wherein the spring is a compression coil spring and the stem causes the spring to be compressed to a greater extent than the hollow rod so that the hollow rod retains the spring in a partially compressed state if the stem is released from the proximal or distal spring seat.

12. A valve having secondary spring force containment comprising:

a) a valve body featuring an opening;

b) a valve closure member sized to close the opening of the valve body;

c) a stem having a first end and a second end, the first end of the stem connected to the valve closure member;

d) a proximal spring seat positioned adjacent to the valve body;

e) a distal spring seat mounted on the second end of the stem;

f) a spring positioned between the proximal and distal spring seats so that said valve closure member is urged into a position where the valve body opening is closed;

g) a hollow rod attached between the proximal and distal spring seats with said stem passing through the hollow rod;

h) a canister having a first end attached to the proximal spring seat, with said canister generally surrounding the spring;

i) the canister featuring an open second end; and j) an insert positioned and secured within the open second end of the canister.

13. A secondary spring force containment assembly for a valve having a stem comprising:

a) a proximal spring seat;

b) a distal spring seat;

c) a spring positioned between the proximal and distal spring seats; and d) a hollow rod attached between the proximal and distal spring seats, said hollow rod adapted to receive the stem of the valve with a position of the proximal spring seat or a position of the distal spring seat being adjustable with respect to the hollow rod;

e) the hollow rod passing through the proximal spring seat and including a threaded portion; and f) the proximal spring seat secured to the hollow rod at least in part by a nut that engages the threaded portion of the hollow rod.

14. The assembly of claim 13 further comprising a canister having a first end attached to the proximal spring seat, with said canister generally surrounding the spring.

15. The assembly of claim 13 wherein the spring is a coil spring.

16. The assembly of claim 13 wherein the spring is a compression coil spring.

17. A secondary spring force containment assembly for a valve having a stem comprising:

a) a proximal spring seat;

b) a distal spring seat;

c) a spring positioned between the proximal and distal spring seats; and d) a hollow rod attached between the proximal and distal spring seats, said hollow rod adapted to receive the stem of the valve;

e) a canister having a first end attached to the proximal spring seat, with said canister generally surrounding the spring f) the canister featuring an open second end; and g) an insert positioned and secured within the open second end of the canister.

18. The assembly of claim 17 wherein a position of the proximal spring seat or a position of the distal spring seat is adjustable with respect to the hollow rod.

19. The assembly of claim 18 wherein the hollow rod passes through the proximal spring seat and includes a threaded portion and the proximal spring seat is secured to the hollow rod at least in part by a nut that engages the threaded portion of the hollow rod.

20. The assembly of claim 17 wherein the insert is secured within the open end of the canister with fasteners.

* * * * *